(12) United States Patent
Weber et al.

(10) Patent No.: US 10,654,339 B2
(45) Date of Patent: May 19, 2020

(54) METHOD OF PAIRING A SENSOR NODE FOR A TRANSPORT REFRIGERATION SYSTEM USING AN ASSISTING DEVICE, AN ASSISTING DEVICE FOR PAIRING A SENSOR NODE AND A PAIRING SYSTEM FOR A TRANSPORT REFRIGERATION SYSTEM

(71) Applicant: THERMO KING CORPORATION, Minneapolis, MN (US)

(72) Inventors: Mark P. Weber, Oakdale, MN (US); Matthew Srnec, Minnetonka, MN (US); Matthew S. Nelson, Cottage Grove, MN (US); Russell L. Sanders, Minnetonka, MN (US); Paul J. Kroes, Eden Prairie, MN (US)

(73) Assignee: Thermo King Corporation, Minneapolis, MN (US)

( * ) Notice: Subject to any disclaimer, the term of this patent is extended or adjusted under 35 U.S.C. 154(b) by 197 days.

(21) Appl. No.: 15/630,588

(22) Filed: Jun. 22, 2017

(65) Prior Publication Data

US 2017/0368910 A1 Dec. 28, 2017

Related U.S. Application Data

(60) Provisional application No. 62/354,409, filed on Jun. 24, 2016.

(51) Int. Cl.
*B60H 1/00* (2006.01)
*B60K 35/00* (2006.01)
(Continued)

(52) U.S. Cl.
CPC ..... *B60H 1/00985* (2013.01); *B60H 1/00364* (2013.01); *B60H 1/00778* (2013.01);
(Continued)

(58) Field of Classification Search
CPC ............ B60H 1/00985; B60H 1/00778; B60H 1/00364; B60H 1/3232; B60H 2001/3236; H04B 1/082; B60K 35/00; H04W 88/04
See application file for complete search history.

(56) References Cited

U.S. PATENT DOCUMENTS

2003/0037177 A1* 2/2003 Sutton ................... H04L 41/024
719/316
2003/0096576 A1* 5/2003 Salonidis .............. H04W 48/16
455/41.1
(Continued)

OTHER PUBLICATIONS

Steven Charles Cook: "Dynamic Near Field Communication Pairing for Wireless Sensor Networks"; Brigham Young University, Department of Computer Science, 2013, pp. 1-60.

*Primary Examiner* — Henry T Crenshaw
(74) *Attorney, Agent, or Firm* — Hamre, Schumann, Mueller & Larson, P.C.

(57) ABSTRACT

A method of pairing a sensor node of a transport refrigeration system with a coordinator node using an assisting device in a communication network is provided, the method includes: the assisting device obtains identification information of the sensor node; the assisting device connects with the coordinator node; the assisting device transmits the identification information of the sensor node to the coordinator node for the coordinator node to pair with the sensor node; the assisting device receives pairing status of the sensor node and the coordinator node; and the assisting device indicates the pairing status.

20 Claims, 4 Drawing Sheets

(51) Int. Cl.
 H04B 1/08 (2006.01)
 B60H 1/32 (2006.01)
(52) U.S. Cl.
 CPC ........... B60H 1/3232 (2013.01); B60K 35/00 (2013.01); H04B 1/082 (2013.01); *B60H 2001/3236* (2013.01); *B60K 2370/566* (2019.05)

(56) References Cited

U.S. PATENT DOCUMENTS

| | | | | |
|---|---|---|---|---|
| 2008/0170537 A1* | 7/2008 | Lai | ........................ | H04W 48/18 370/328 |
| 2009/0022078 A1* | 1/2009 | Patterson | ............... | G01D 21/00 370/311 |
| 2009/0233635 A1* | 9/2009 | Li | ........................... | H01Q 3/26 455/509 |
| 2011/0250707 A1* | 10/2011 | Takano | ................ | G05B 19/128 438/5 |
| 2011/0280167 A1* | 11/2011 | Bornstein | .......... | H04W 52/0251 370/311 |
| 2013/0247594 A1* | 9/2013 | Sanders | ................ | H04W 52/02 62/56 |
| 2013/0252550 A1* | 9/2013 | Johnson | ................... | H04Q 9/00 455/41.2 |
| 2013/0252552 A1* | 9/2013 | Vitkus | ..................... | H04Q 9/00 455/41.2 |
| 2013/0285831 A1* | 10/2013 | Sanders | ................ | H04W 52/02 340/870.01 |
| 2014/0273845 A1 | 9/2014 | Russell et al. | | |
| 2014/0315494 A1* | 10/2014 | Son | ...................... | A61B 5/0002 455/41.2 |
| 2014/0354429 A1* | 12/2014 | Henderson | ............. | G08B 21/22 340/541 |
| 2015/0023204 A1* | 1/2015 | Wik | ...................... | H04W 48/14 370/254 |
| 2017/0147772 A1* | 5/2017 | Meehan | ............ | G06F 19/3418 |
| 2017/0357607 A1* | 12/2017 | Cayemberg | ........... | G06F 13/362 |
| 2018/0045674 A1* | 2/2018 | Maulder | ............ | G01N 27/4168 |

\* cited by examiner

METHOD OF PAIRING A SENSOR NODE FOR A TRANSPORT REFRIGERATION SYSTEM USING AN ASSISTING DEVICE, AN ASSISTING DEVICE FOR PAIRING A SENSOR NODE AND A PAIRING SYSTEM FOR A TRANSPORT REFRIGERATION SYSTEM

FIELD

The embodiments described herein relate generally to a transport refrigeration system that is generally used to control an environmental condition (e.g., temperature, humidity, air quality, and the like) within a transport unit (e.g., a container (such as a container on a flat car, an intermodal container, etc.), a truck, a box car, or other similar transport unit (generally referred to as a "transport unit"). More particularly, the embodiments described herein relate to pairing a sensor node with a coordinator node for the transport refrigeration system.

BACKGROUND

Cargo is stored and transported in a cargo space of a transport unit. A transport refrigeration system is usually incorporated with the transport unit for maintaining desired environmental conditions within the cargo space. Sensors are typically provided in the transport unit for sensing and monitoring the environmental conditions or status relating to the transport unit. Sensors often used include a temperature sensor for monitoring the temperature within the cargo space, a door sensor for sensing whether a door of the transport unit for accessing the cargo is in open status or not, and a fuel sensor for measuring fuel level in the fuel tank of the transport unit. The sensors report data they collect to a controller of the transport refrigeration system and obtain commands from the controller. A coordinator can be used to receive, on behalf of the controller, the data of the sensors via a communication network. Thus, it is desirable to establish a communication network of the sensors and the coordinator in a transport refrigeration system. However, establishing pairing link between a sensor and a coordinator of a transport refrigeration system can present challenges.

SUMMARY

The embodiments described herein are directed to aspects of managing a communication network of a sensor and a coordinator for a transport refrigeration system. In particular, these embodiments provide systems and methods for pairing a coordinator node to a sensor node using an assisting device.

These embodiments simplify the pairing connection of the sensor node and the coordinator node with minimal user interaction or knowledge of pairing communication nodes (one or more sensor nodes, one or more coordinator node, etc.). The sensor node can be paired to the connector node without being in a discoverable mode. These embodiments can also enable a user to determine a status of the pairing connection.

In one embodiment, a method of pairing a sensor node for a transport refrigeration system with a coordinator node using an assisting device in a communication network is provided. The method includes: the assisting device obtains identification information of the sensor node; the assisting device connects with the coordinator node; the assisting device transmits the identification information of the sensor node to the coordinator node for the coordinator node to pair with the sensor node; the assisting device receives pairing status of the sensor node and the coordinator node; and the assisting device indicates the pairing status.

In another embodiment, an assisting device for pairing a sensor node for a transport refrigeration system with a coordinator node in a communication network is provided. The assisting device includes an information obtaining unit, a network unit, a control unit, a receiving unit and a display unit. The information obtaining unit obtains identification information of the sensor node. The network unit connects with the coordinator node. The transmitting unit transmits the identification information of the sensor node to the coordinator node for the coordinator node to pair with the sensor node. The receiving unit receives pairing status of the sensor node and the coordinator node. The display unit indicates the pairing status of the sensor node and the coordinator node.

In yet another embodiment, a pairing system for a transport refrigeration system is provided. The pairing system includes the assisting device presented above.

DRAWINGS

These and other features, aspects, and advantages of the aspects of this disclosure will become better understood when the following detailed description is read with reference to the accompanying drawing, wherein.

While the above-identified drawing figures set forth particular embodiments of the pairing methods and systems, other embodiments are also contemplated, as noted in the discussion. In all cases, this disclosure presents illustrated embodiments of the pairing methods and systems by way of representation and not limitation. Numerous other modifications and embodiments can be devised by those skilled in the art which fall within the scope and spirit of the principles of the pairing methods and systems described herein.

DETAILED DESCRIPTION

The embodiments provide systems and methods for pairing a coordinator node to a sensor node using an assisting device. The use of the assisting device in the pairing connection requires minimal user interaction or knowledge of pairing communication nodes. The sensor node can be paired to the connector node without being in a discoverable mode. A user can also determine a status of the pairing connection easily.

Figure 1:
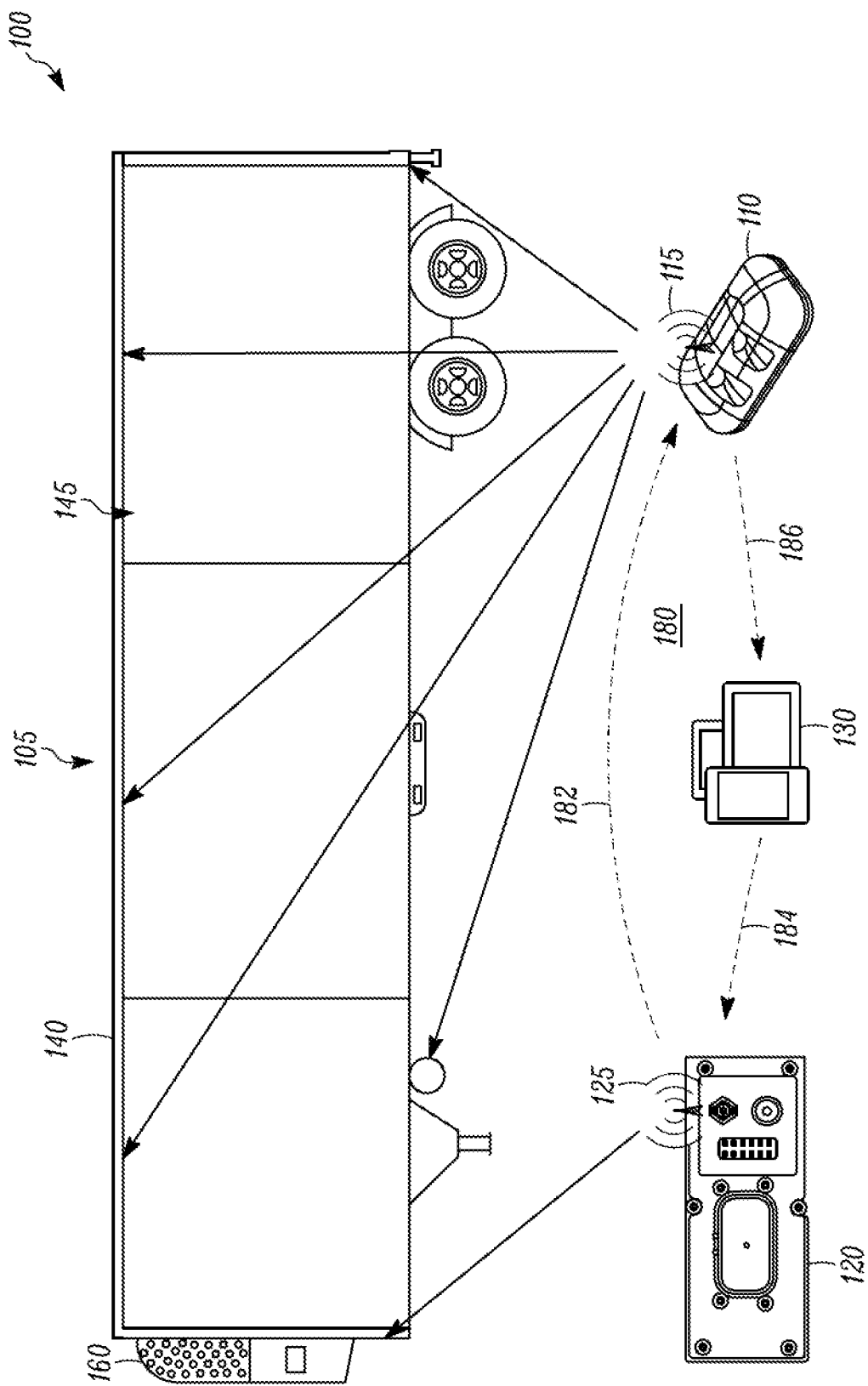
FIG. 1 is a schematic diagram of a pairing system for a transport unit with a transport refrigeration system, according to one embodiment.

FIG. 1 is a pairing system 100 for a transport unit 140 with a transport refrigeration system 105. The transport refrigeration system 105 includes a transport refrigeration unit 160 provided on the transport unit 140. The transport refrigeration unit 160 can be a vapor-compressor type refrigeration system, or any other suitable refrigeration unit installed on a side wall of the transport unit 140. The transport refrigeration unit 160 is configured to environmentally control an internal space 145 of the transport unit 140 for maintaining a desired environmental condition, including temperature, humidity, atmosphere etc., within the internal space 145. The transport refrigeration unit 160 can be equipped with a controller (which is not shown), for controlling the environmental conditions within the internal space 145.

One or more sensor nodes, which are symbolically represented by the sensor node 110 in FIG. 1, can be provided at various locations of the transport unit 140. For example, the sensor node 110 can be a fuel tank level sensor, a transport unit side door sensor for monitoring whether a side door of the transport unit is open or closed, and a transport unit rear door sensor, etc. as indicated by the arrows in FIG. 1. The sensor node 110 is equipped with an antenna 115 for remotely communicating with a coordinator node 120, as shown in FIG. 1. The sensor node 110 may be sensors without antennas. The coordinator node 120 is configured to receive data sensed by the sensor node 110 and transmit the data, for example, to the controller. The coordinator node 120 may also send instructions from the controller to the sensor node 110 for controlling operation of the sensor node 110. The coordinator node 120 is equipped with an antenna. 125 for remotely communicating with the sensor node 110, as shown in FIG. 1. The coordinator node 120 and the sensor node 110 can be paired to allow communication between them.

Any assisting device 130 is provided for assisting the pairing operation. The assisting device 130 may be a wireless portable electronic device, a laptop, a personal computer, a customized piece of hardware, etc. For example, in some embodiments the assisting device can be a mobile phone. The assisting device 130, the sensor node 110 and the coordinator node 120 may communicate with each other through a communication network 180. The communication network 180 may include more than one communication protocol. For example, the communication network 180 includes a first network part 182 such as a Bluetooth network between the sensor node 110 and a coordinator node 120, a second network part 184 such as a WiFi network 184 between the coordinator node 120 and the assisting device 130, and a third network part 186 such as a NFC network between the sensor node 110 and the assisting device 130. The assisting device 130 may be equipped with a screen so that the pairing status can be displayed on the screen to the user. Pairing status information that can be displayed can include: a series number and/or model of the sensor node 110, data gauged by the sensor node 110 (e.g., a temperature, oil tank level, etc.), configuration information related to linking a sensor node 110 to a particular working zone, etc. The pairing status information may also include, for example, one or more pairing options for the user, a present status of the pairing system, etc. The pairing status information can be provided on a graphical display using words or pictures during the pairing course. This enables the user to determine the status of the pairing connection in an easy and friendly manner. That is, the user can obtain the status of the pairing connection without having to, for example, memorize or look up in a user manual what statuses various blinking LED code signals represent.

Figure 2:
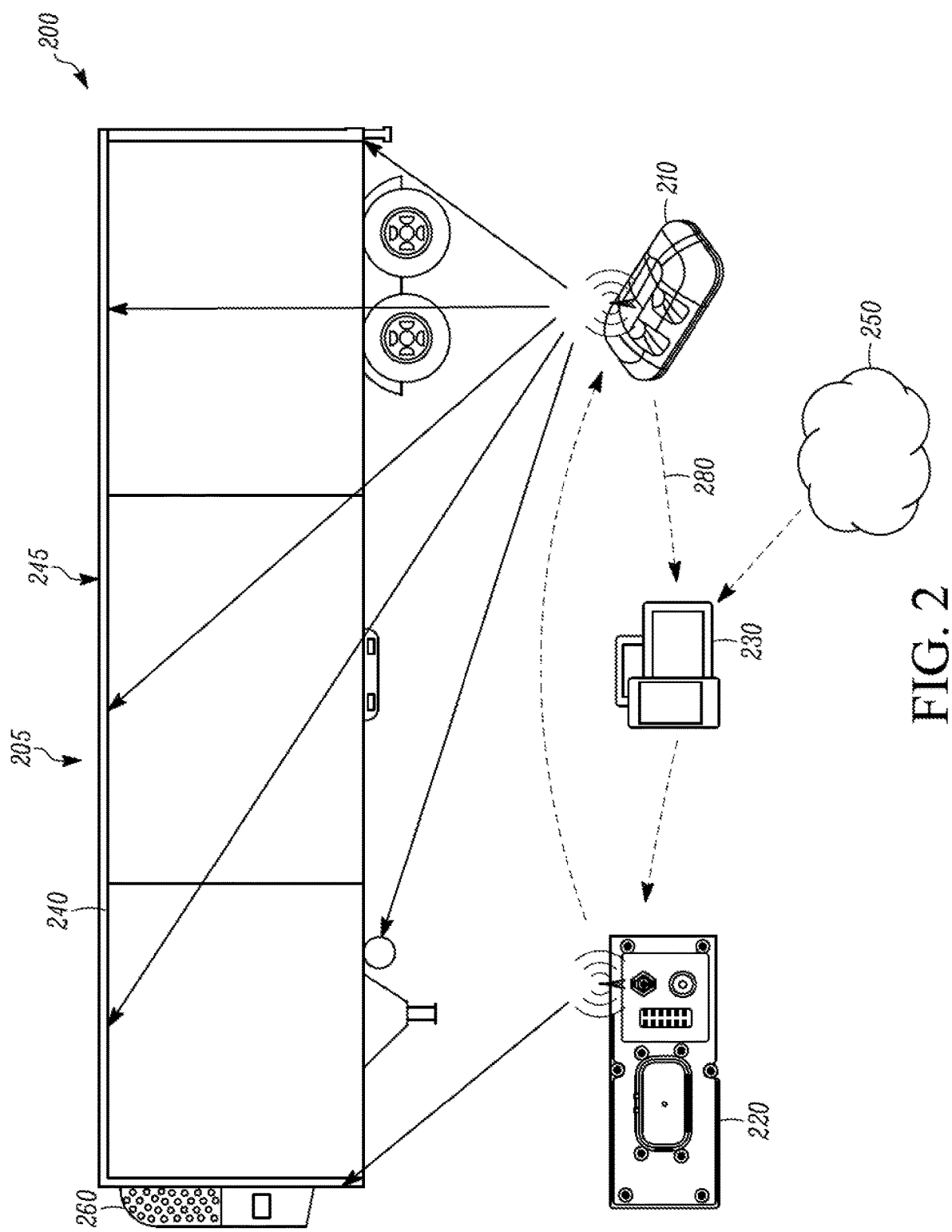
FIG. 2 is a schematic diagram of another exemplary pairing system for a transport unit with a transport refrigeration system, according to another embodiment.

FIG. 2 is a schematic diagram of another exemplary pairing system 200 for a transport unit 240 with a transport refrigeration system 205, according to another embodiment. The assisting device 230 may obtain the identification information of the sensor node 210 from a cloud server 250. The transport refrigeration system 205 includes a transport refrigeration unit 260 provided on the transport unit 240. The transport refrigeration unit 260 is configured to environmentally control an internal space 245 of the transport unit 240 for maintaining a desired environmental condition. The pairing system 200 can conduct the pairing connection through the use of the cloud server 250. As sensors and coordinators are manufactured, a database for storing, for example, the MAC address (Media Access Control address, which is the physical or hardware address of a network device) together with the serial number, is established for each sensor and coordinator. A user who purchases, for example, multiple sensors and one coordinator, may access the cloud server 250 by logging onto an assisting device 230, a personal computer, with a user account to pair the sensors and the coordinator in the user's communication network such as a Bluetooth network, after the sensors and the coordinator are installed and turned on. The user can see the list of the sensors and the coordinator he or she has purchased but not yet paired. The user can select the sensors and the coordinator on the list to be paired. The personal computer obtains the MAC address and the serial number of the selected sensors to be paired and sends the identification information to the selected coordinator. Then, the coordinator pairs all the selected sensors and sends the pairing status of these sensors and the coordinator to the personal computer. If the pairing status information shows that a pairing link between some or all of these sensors fail to establish, then the user may initiate another round of pairing operation.

In some embodiments, the assisting device 230 may obtain the identification information of the coordinator node 220 before connecting with the coordinator node 220 to make sure that the assisting device 230 is connected to the desired coordinator node 220, especially when there is more than one coordinator in the communication network of a user. The personal computer may also obtain the MAC address and the serial number of the coordinator node 220 from the cloud server 250.

The sensor node 210 may be one or more of a door sensor node, a temperature sensor node, a humidity sensor node, a fuel tank level sensor node, a light sensor node, a load sensor node and a voltage senor node for monitoring the voltage of a battery powering a sensor for the transport refrigeration unit. Any sensor node applicable to a transport refrigeration unit may be paired with the pairing system above.

Figure 3:
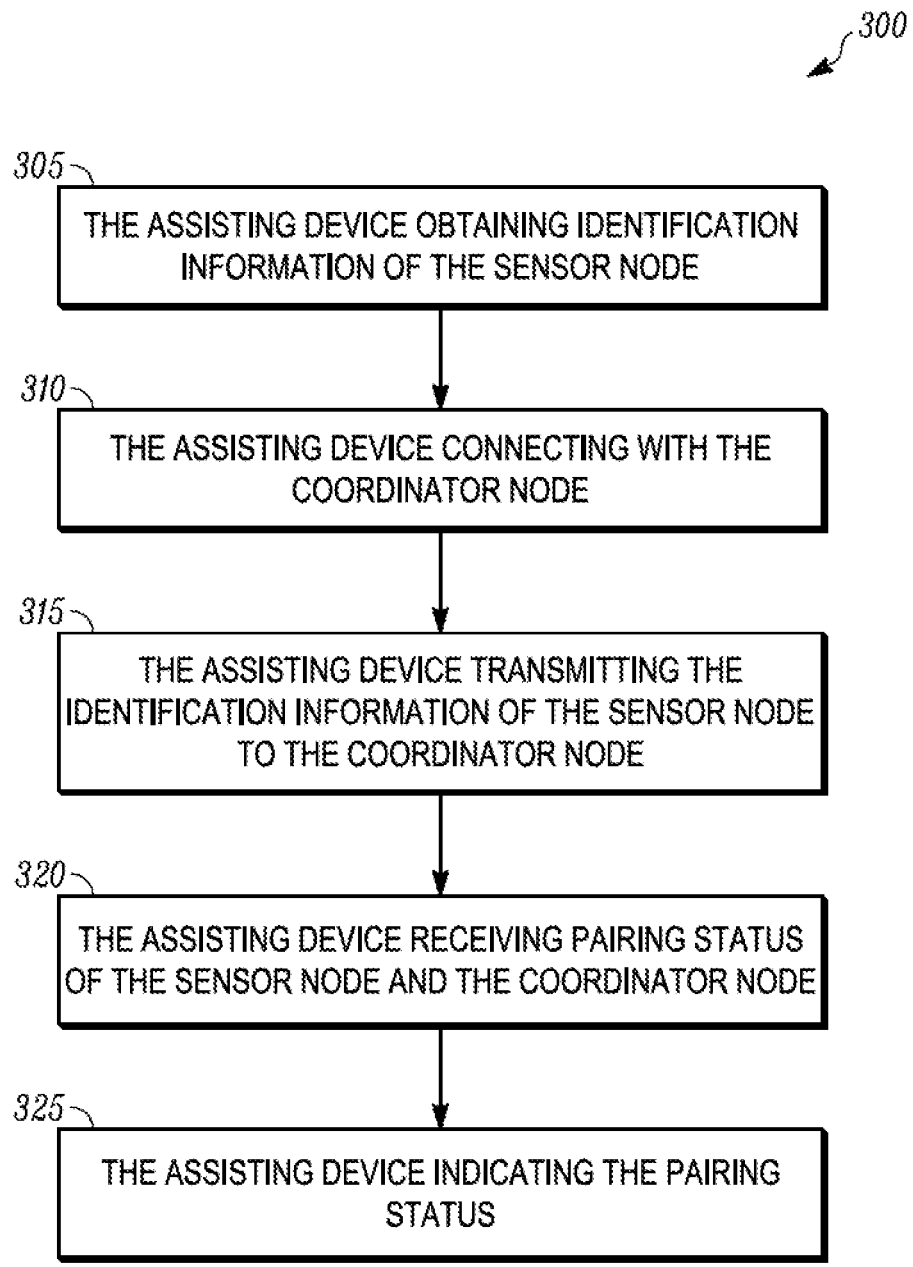
FIG. 3 is a flowchart illustrating a method of pairing a sensor node for a transport refrigeration system with a coordinator node using an assisting device in a communication network, according to one embodiment.

FIG. 3 is a flowchart illustrating a method 300 of pairing a sensor node for a transport refrigeration system with a coordinator node using an assisting device in a communication network, according to one embodiment. The method can simplify the pairing operation by requiring minimal user interaction or knowledge of pairing communication nodes. The sensor node can be paired to the connector node without being in a discoverable mode. A user can also determine a status of the pairing connection easily.

Details of how the method is implemented are as follows. The method begins at 305 whereby an assisting device (e.g., the assisting devices 130, 230 shown in FIGS. 1 and 2) obtains identification information of a sensor node (e.g., the sensor nodes 110, 210 shown in FIGS. 1 and 2). The assisting device can be used to ease the pairing operation of the sensor node and the coordinator node. At 305, the assisting device may obtain the identification information of the sensor node with a transceiver or an I/O part of the assisting device through a communication network (e.g. the communication networks 180, 280 shown in FIGS. 1 and 2) that links the sensor node, the coordinator node and the assisting device. The assisting device can obtain identification information of the sensor node by reading, for example, a MAC address, a characterized string, a barcode, a Near Field Communication a (NFC) tag, a Radio Frequency ID tag, a series number that corresponds to the MAC address of the sensor node 10 etc.

The communication network applicable to the pairing method 300 may be a Wireless Personal Area. Network (WPAN). The Wireless Personal Area. Network may be Bluetooth network, a NFC network, a WiFi Communication network, a Radio Frequency ID (RFID) network, and a ZigBee communication network, etc. A user can select one of these networks considering the complexity of the network protocol, hardware costs, communication ranges between the sensor node, the coordinator node, the assisting device, and other related factors. For example, it can be relatively easy to set up a Bluetooth connection, as a user just needs to pass over the MAC address. Setting up a WiFi connection can be more difficult. The assisting device may be required to connect with the sensor node over a WiFi direct type connection. First set up the WiFi network info nation, then switch to the WiFi network being used, and then communicate the sensor node information over to the coordinator node, which can then communicate with the sensor node. In another embodiment, the communication network can be a NFC network. The NFC network can be configured to operate on a 13.56 MHz radio band and can have a maximum read distance of a few centimeters. The sensor node can have a NFC tag where the identification information of the sensor node can be stored. The assisting device can include a NFC reader. To initiate the pairing operation, a user can hold the sensor node and the assisting device close together. Once within the NFC effective communication distance, the assisting device can start to communicate with the sensor node, i.e., the reader of the assisting device can read the NFC tag of the sensor node and obtain the identification information of the sensor node. In some embodiments, the communication network can be a Bluetooth network.

At 310, the assisting device connects with the coordinator node. This can be performed by the assisting device sending a request to the coordinator or by setting the coordinator in a discoverable mode that allows the assisting device to discover the coordinator. For example, the coordinator may broadcast as a WiFi direct type of connection that the assisting device can see and use to connect to the coordinator. This allows the coordinator and the assisting device to communicate and also, for example, to talk with other nodes in the WiFi network.

In another example, the coordinator can use a NFC connection that the assisting device can use to get a Bluetooth connection MAC address. The assisting device can connect with the coordinator using the Bluetooth connection MAC address and then start to communicate with the coordinator via a Bluetooth network.

There are also examples where an assisting device can access the address of a coordinator. In these examples, the assisting device can directly establish a connection with the coordinator using an accessible coordinator address. When the connection is established, the method 300 proceeds to 315.

At 315, the assisting device transmits the identification information of the sensor node to the coordinator node. In some embodiments, the assisting device includes a transceiver and/or I/O part to transmit the identification information to the coordinator node. With the identification information of the sensor node 110, the coordinator node 120 can pair with the sensor node 110 without the sensor node and/or coordinator node being in a discoverable mode. In some embodiments, more than one piece of identification information may be used to properly connect the coordinator node to the sensor node. For example, the assisting device can obtain both a MAC address and a characterized string of a sensor node for allowing a coordinator node to connect to this sensor node. The coordinator node may initiate the pairing operation by itself once it receives the identification information of the sensor node. The assisting device may send a message to the coordinator node instructing the coordinator node to conduct the pairing operation with the sensor node.

At 320, the assisting device receives pairing status feedback information from the sensor node and/or the coordinator node on the pairing status of the sensor node to the coordinator node. The method 300 then proceeds to 325. The pairing status feedback information may indicate, for example, whether the connection is established, the signal strength of the connection, an error code, etc. The coordinator node or the sensor node may automatically send the pairing status feedback information to the assisting device after the coordinator nodes have tried to pair with the sensor node.

At 325, the assisting device 130, 230 indicates the pairing status to a user using the received pairing status feedback information. The assisting device 130, 230 can indicate the pairing status to the user using, for example, words and/or pictures so that the user can obtain and decipher the pairing results easily, immediately and directly. The assisting device 130, 230 may also indicate an error to the user based on error code sent by the coordinator node or the sensor node to help the user identify the error. The user may operate the assisting device to conduct the pairing method 300 again if the pairing status indicates that the pairing link fails to establish.

It should be noted that the pairing method 300 above may be implemented in any workable order. For example, the assisting device may connect with the coordinator node before or while obtaining identification information of the sensor node. In addition to 305-325, there can be other intermediate operations depending on the network protocol used. For example, when a WiFi network is used, the assisting device can connect with the sensor node first over a WiFi direct type connection, setup the WiFi network information, then switch to the WiFi network being used before operations 305-325 are carried out.

Figure 4:
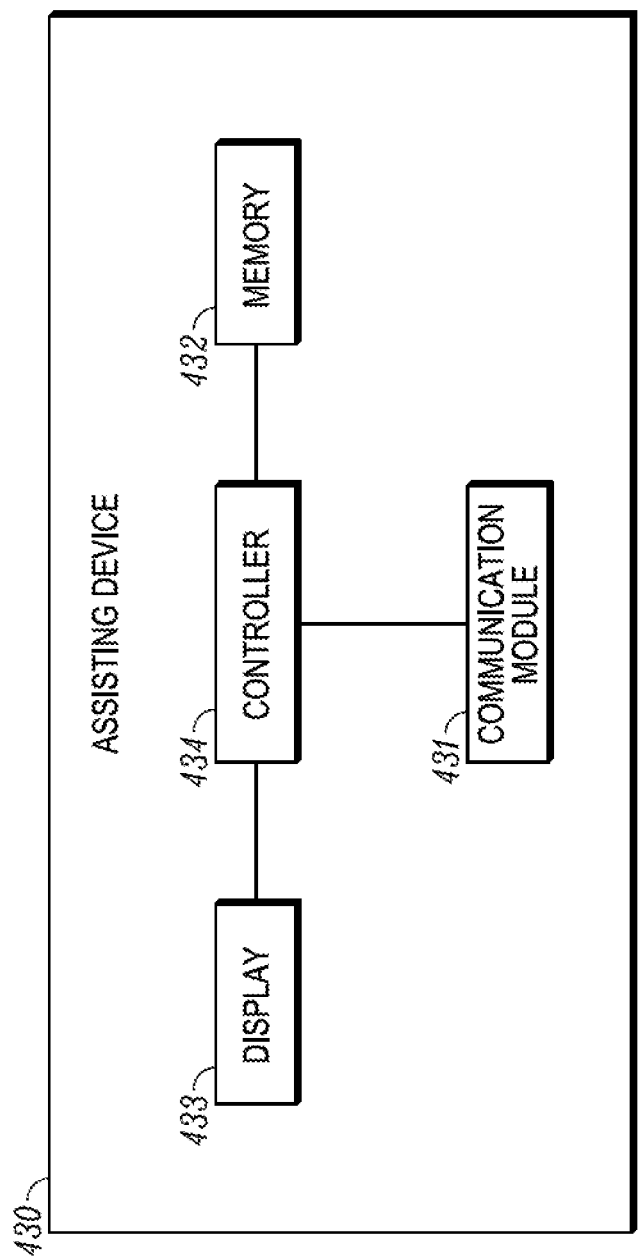
FIG. 4 is a schematic diagram of an exemplary assisting device for pairing a sensor node for a transport refrigeration system with a coordinator node in a communication network, according to one embodiment.

FIG. 4 is a schematic diagram of an exemplary assisting device for pairing a sensor node of a transport refrigeration unit with a coordinator node in a communication network, according to one embodiment. The assisting device 430 includes a communication module 431, a memory 432, a display 433 and a controller 434. The communication module 431, for example, can be the Bluetooth module of a smart phone, a network port of a personal computer, or a barcode reader. The communication module 431 can be configured to obtain identification information of a sensor node (e.g., the sensor nodes 110, 210 shown in FIGS. 1 and 2). The communication module 431 is also configured to connect with a coordinator node (e.g., the coordinator nodes 120, 220 shown in FIGS. 1 and 2), and transmit the identification information of a sensor node to a coordinator node.

The memory 432 can store the identification information and pairing status information obtained by the communication module 431. The display 433 can be, for example, the screen of a mobile phone or a personal computer. The display 433 can receive pairing status of a sensor node and a coordinator node 120, 220 from the memory 432, and indicate a pairing status to a user. The display 433 can include a graphic user interface (GUI) to present in words or pictures the pairing status and other related information to the user (e.g., pairing options for the user). The display 433 with a GUI can, for example, spare the user from memorizing or looking up in a user manual LED status indicators. The controller 534 may be a computer processor. It can conduct logic control instruct a coordinator node to pair with a sensor node based on identification information of the sensor node.

The embodiments described herein advantageously provide an assisting device for pairing a sensor node of a transport refrigeration unit with a coordinator node, a method to do the pairing, and a pairing system including the assisting device. The assisting device, the method and the pairing system do not require a user to know anything about the communication network. The coordinator node conducts the pairing connection based on the identification information of the sensor node that the assisting device has transmitted to the coordinator node. The user is also spared from setting any device, including the sensor node and the coordinator node, to certain modes at certain times. For example, the user does not need to double tap a sensor node with a certain range of delay to trigger the sensor node into a discoverable mode. This also means that the sensor node does not need to be within arm's reach in order to pair to the coordinator node, since a discoverable mode of the sensor node is not needed at all. Neither does the user need to push buttons for selecting a zone on a coordinator node where the user wishes to add the sensor node and get pairing status from LED light blinking in certain orders. The assisting device, the method and the pairing system allow the user to perform pairing between a sensor node and a coordinator node without physically interacting with the sensor node and the coordinator node. The pairing status of the sensor node and the coordinator node is illustrated in a more understandable manner. When there is a plurality of sensor nodes to be paired, the user is not required to go through a pairing procedure for pairing each sensor node. That is, two or more of the plurality of the sensor nodes can be paired by going through the pairing procedure once.

While the embodiments have been described in terms of various specific embodiments, those skilled in the art will recognize that the embodiments can be practiced with modification within the spirit and scope of the aspects.

Aspects

It is appreciated that any of aspects 1-12, 13-23 and 24-25 can be combined.

Aspect 1. A method of pairing a sensor node for a transport refrigeration system with a coordinator node using an assisting device in a communication network, the method comprising:
the assisting device obtaining identification information of the sensor node;
the assisting device connecting with the coordinator node;
the assisting device transmitting the identification information of the sensor node to the coordinator node for the coordinator node to pair with the sensor node;
the assisting device receiving pairing status of the sensor node and the coordinator node; and
the assisting device indicating the pairing status.

Aspect 2. The method according to aspect 1, the method further comprising: the assisting device instructing the coordinator node to pair with the sensor node based on the identification information of the sensor node before the assisting device receiving pairing status of the sensor node and the coordinator node.

Aspect 3. The method according to any of aspects 1-2, the assisting device receiving pairing status of the sensor node and the coordinator node from the sensor node or the coordinator node.

Aspect 4. The method according to any aspects of aspects 1-3, wherein the assisting device is a wireless portable electronic device.

Aspect 5. The method according to any of aspects 1-4, wherein the assisting device indicating the pairing status includes the assisting device displaying the pairing status on a screen of the assisting device.

Aspect 6. The method according to any of aspects 1-5, wherein the coordinator node is a Wireless Personal Area. Network coordinator and the communication network is a Wireless Personal Area Network.

Aspect 7. The method according to aspect 6, wherein the Wireless Personal ea Network is one selected from the group consisting of Bluetooth network, a Near Field Communication network, a WiFi communication network, a Radio Frequency ID system, and a ZigBee communication network.

Aspect 8. The method according to any of aspects 1-7, wherein the assisting device obtaining identification information of the sensor node is performed by reading at least one of: a MAC address, a barcode, a Near Field Communication tag, a Radio Frequency ID tag, a series number in association with a MAC address, and text information for identifying the sensor node.

Aspect 9. The method according to any of aspects 1-8, wherein the assisting device obtaining identification information of the sensor node includes the assisting device obtaining identification information of the sensor node from a cloud server.

Aspect 10. The method according to any of aspects 1-9, the method further comprising: the assisting device obtaining the identification information of the coordinator node prior to the assisting device connecting with the coordinator node.

Aspect 11. The method according to aspect 10, wherein the assisting device obtaining the identification information of the coordinator node includes the assisting device obtaining the identification information of the coordinator node from a cloud server.

Aspect 12. The method according to any of aspects 1-11, wherein the sensor node is one or more of a door sensor node, a temperature sensor node, a humidify sensor node, a fuel tank level sensor node, a light sensor node, a load sensor node and a voltage senor node for monitoring the voltage of a battery powering a sensor for the transport refrigeration system.

Aspect 13. An assisting device for pairing a sensor node for a transport refrigeration system with a coordinator node in a communication network, the assisting device comprising:
an information obtaining unit for obtaining identification information of the sensor node;
a network unit for connecting with the coordinator node;
a transmitting unit for transmitting the identification information of the sensor node to the coordinator node for the coordinator node to pair with the sensor node;
a receiving unit for receiving pairing status of the sensor node and the coordinator node; and
a display unit for indicating the pairing status.

Aspect 14. The assisting device according to aspect 13, the assisting device further comprising a control unit for instructing the coordinator node to pair with the sensor node based on the identification information of the sensor node.

Aspect 15. The assisting device according to any of aspects 13-14, wherein the receiving unit for receiving pairing status of the sensor node and the coordinator node from the sensor node or the coordinator node.

Aspect 16. The assisting device according to any of aspects 13-15, wherein the assisting device is a wireless portable electronic device.

Aspect 17. The assisting device according to any of aspects 13-16, wherein the assisting device includes a screen on which the pairing status is displayed.

Aspect 18. The assisting device according to aspect 17, wherein the assisting device is a portable electronic device with a user interface on the screen to display the pairing status.

Aspect 19. The assisting device according to any of aspects 13-17, the communication network is a Wireless Personal Area Network.

Aspect 20. The assisting device according to aspect 19, wherein the Wireless Personal Area Network is one selected from the group consisting of Bluetooth network, a Near Field Communication network, a WiFi communication network, a Radio Frequency ID system, and a ZigBee communication network.

Aspect 21. The assisting device according to any of aspects 13-20, wherein the sensor node includes at least one of a MAC address, a barcode, a Near Field Communication tag, a Radio Frequency ID tag, a series number in association with a MAC address, and text information that allows the coordinator to identify the sensor node.

Aspect 22. The assisting device according to any of aspects 13-21, the coordinator node includes at least one of: a MAC address, a barcode, a Near Field Communication tag, a Radio Frequency ID tag, a series number in association with a MAC address, or text information that allows the assisting device to identify the coordinator node.

Aspect 23. The assisting device according, to any of aspects 13-22, the sensor node of the transport refrigeration system is one of a door sensor node, a temperature sensor node, a humidity sensor node, a fuel sensor node, a light sensor node, a load sensor node, and a voltage sensor node for monitoring the voltage of a battery powering a sensor.

Aspect 24. A pairing system comprising an assisting device for pairing a sensor node of a transport refrigeration system with a coordinator node in a communication network, the assisting device comprising:
  an information obtaining unit for obtaining identification information of the sensor node;
  a network unit for connecting with the coordinator node;
  a transmitting unit for transmitting the identification information of the sensor node to the coordinator node for the coordinator node to pair with the sensor node;
  a receiving unit for receiving pairing status of the sensor node and the coordinator node; and
  a display unit for indicating the pairing status.

Aspect 25. The pairing system according to aspect 24, further comprising:
  a sensor node of the transport refrigeration system configured to monitor a condition within the transport refrigeration system;
  a coordinator node configured to manage and control operation of the sensor node; and
  a communication network connecting the sensor node to the coordinator node.

What is claimed is:

1. A method of pairing a sensor node for a transport refrigeration system with a coordinator node using an assisting device in a communication network, the method comprising:
  the assisting device obtaining identification information of the sensor node;
  the assisting device connecting with the coordinator node;
  the assisting device transmitting the identification information of the sensor node to the coordinator node for the coordinator node to pair with the sensor node;
  the assisting device receiving pairing status of the sensor node and the coordinator node in response to transmitting the identification information of the sensor node to the coordinator node; and
  the assisting device indicating the pairing status.

2. The method according to claim 1, the method further comprising: the assisting device instructing the coordinator node to pair with the sensor node based on the identification information of the sensor node before the assisting device receiving pairing status of the sensor node and the coordinator node.

3. The method according to claim 1, wherein the assisting device receives pairing status of the sensor node and the coordinator node from the sensor node or the coordinator node.

4. The method according to claim 1, wherein the assisting device is a wireless portable electronic device.

5. The method according to claim 1, wherein the coordinator node is a Wireless Personal Area Network coordinator and the communication network is a Wireless Personal Area Network, and
  wherein the Wireless Personal Area Network is one selected from a group consisting of Bluetooth network, a Near Field Communication network, a WiFi communication network, a Radio Frequency ID system, and a ZigBee communication network.

6. The method according to claim 1, wherein the assisting device obtaining identification information of the sensor node is performed by reading at least one of: a MAC address, a barcode, a Near Field Communication tag, a Radio Frequency ID tag, a series number in association with a MAC address, and text information for identifying the sensor node.

7. The method according to claim 1, the method further comprising: the assisting device obtaining the identification information of the coordinator node prior to the assisting device connecting with the coordinator node.

8. The method according to claim 1, wherein the sensor node is one or more of a door sensor node, a temperature sensor node, a humidity sensor node, a fuel tank level sensor node, a light sensor node, a load sensor node and a voltage senor node for monitoring the voltage of a battery powering a sensor for the transport refrigeration system.

9. An assisting device for pairing a sensor node for a transport refrigeration system with a coordinator node in a communication network, the assisting device comprising:
  an information obtaining unit for obtaining identification information of the sensor node;
  a communication module for connecting with the coordinator node;
  a transmitting unit for transmitting the identification information of the sensor node to the coordinator node for the coordinator node to pair with the sensor node;
  a receiving unit for receiving pairing status of the sensor node and the coordinator node in response to the transmitting unit transmitting the identification information of the sensor node to the coordinator node; and a display unit for indicating the pairing status.

10. The assisting device according to claim 9, further comprising a controller for instructing the coordinator node to pair with the sensor node based on the identification information of the sensor node.

11. The assisting device according to claim 9, wherein the receiving unit receives pairing status of the sensor node and the coordinator node from the sensor node or the coordinator node.

12. The assisting device according to claim 9, wherein the assisting device is a wireless portable electronic device with a user interface on a screen to display the pairing status.

13. The assisting device according to claim 9, wherein the communication network is a Wireless Personal Area Network, and wherein the Wireless Personal Area Network is one selected from the group consisting of Bluetooth network, a Near Field Communication network, a WiFi communication network, a Radio Frequency ID system, and a ZigBee communication network.

14. The assisting device according to claim 9, wherein the sensor node includes at least one of a MAC address, a barcode, a Near Field Communication tag, a Radio Frequency ID tag, a series number in association with a MAC address, and text information that allows the coordinator to identify the sensor node.

15. The assisting device according to claim 9, wherein the coordinator node includes at least one of: a MAC address, a barcode, a Near Field Communication tag, a Radio Frequency ID tag, a series number in association with a MAC address, and text information that allows the assisting device to identify the coordinator node.

16. The assisting device according to claim 9, wherein the sensor node of the transport refrigeration system is one of a door sensor node, a temperature sensor node, a humidity sensor node, a fuel sensor node, a light sensor node, a load sensor node, and a voltage sensor node for monitoring the voltage of a battery powering a sensor.

17. A pairing system comprising an assisting device for pairing a sensor node of a transport refrigeration system with a coordinator node in a communication network, the assisting device including:

an information obtaining unit for obtaining identification information of the sensor node;

a communication module for connecting with the coordinator node;

a transmitting unit for transmitting the identification information of the sensor node to the coordinator node for the coordinator node to pair with the sensor node;

a receiving unit for receiving pairing status of the sensor node and the coordinator node in response to the transmitting unit transmitting the identification information of the sensor node to the coordinator node; and a display unit for indicating the pairing status.

18. The pairing system according to claim 17, further comprising:

a sensor node of the transport refrigeration system configured to monitor a condition within the transport refrigeration system;

a coordinator node configured to manage and control operation of the sensor node; and a communication network connecting the sensor node to the coordinator node.

19. The method according to claim 1, wherein the pairing status includes at least one of: an indication of whether a connection between the sensor node and the coordinator node is established, a signal strength of a connection between the sensor node and the coordinator node, and an error code.

20. The method according to claim 1, wherein the assisting device indicating the pairing status includes the assisting device indicating an error in pairing between the sensor node and the coordinator node.

* * * * *